United States Patent
Iannone

(10) Patent No.: US 10,825,044 B2
(45) Date of Patent: Nov. 3, 2020

(54) SYSTEM AND METHOD FOR RECIPE IDENTIFICATION AND CLASSIFICATION

(71) Applicant: Louis Iannone, Apex, NC (US)

(72) Inventor: Louis Iannone, Apex, NC (US)

(*) Notice: Subject to any disclaimer, the term of this patent is extended or adjusted under 35 U.S.C. 154(b) by 0 days.

(21) Appl. No.: 16/151,883

(22) Filed: Oct. 4, 2018

(65) Prior Publication Data
US 2020/0051125 A1 Feb. 13, 2020

Related U.S. Application Data

(63) Continuation-in-part of application No. 15/911,090, filed on Mar. 3, 2018, now abandoned.

(60) Provisional application No. 62/543,602, filed on Aug. 10, 2017.

(51) Int. Cl.
G06Q 30/02 (2012.01)
G06K 19/06 (2006.01)

(52) U.S. Cl.
CPC ... G06Q 30/0255 (2013.01); G06K 19/06028 (2013.01); G06K 19/06037 (2013.01); G06Q 30/0268 (2013.01)

(58) Field of Classification Search
CPC .................................................. G06Q 30/00
See application file for complete search history.

(56) References Cited

U.S. PATENT DOCUMENTS

| | | | | |
|---|---|---|---|---|
| 5,493,107 A | * | 2/1996 | Gupta | G06K 1/121 235/383 |
| 5,797,493 A | * | 8/1998 | Watson | B65D 71/10 206/443 |
| 9,098,558 B2 | * | 8/2015 | Arshad | G06F 40/154 |
| 9,477,777 B2 | * | 10/2016 | Stankiewicz | G06F 16/355 |
| 2002/0007307 A1 | * | 1/2002 | Miller | G06Q 30/0273 705/14.53 |
| 2002/0065720 A1 | * | 5/2002 | Carswell | G06Q 30/02 705/14.26 |
| 2002/0087532 A1 | * | 7/2002 | Barritz | G06F 16/954 |
| 2003/0130908 A1 | * | 7/2003 | Hing | G06Q 30/0633 705/26.8 |
| 2003/0158796 A1 | * | 8/2003 | Balent | G06Q 10/087 705/28 |
| 2007/0027366 A1 | * | 2/2007 | Osburn | G06F 19/3475 600/300 |
| 2008/0249865 A1 | * | 10/2008 | Angell | G06Q 30/06 705/14.34 |

(Continued)

Primary Examiner — Eric R Netzloff
(74) Attorney, Agent, or Firm — NK Patent Law

(57) ABSTRACT

This document presents a system and method for authors or consumers to obtain the same unique, universal classification identifier for every one of the thousands of recipes for the same dish. In this fashion, every one of thousands of chicken parmigiana recipes may have the same unique, universal classification identifier. The data for each of the hundreds or thousands of recipes for a particular dish could be aggregated under the single recipe classification. A consumer may present a recipe containing the universal classification identifier to capture recipe data at a retail establishment. This data could then be scanned at a Point-of-Sale terminal and reported to the retail establishment or other client to inform decisions regarding marketing, advertising, production strategies, and other outreach to consumers.

16 Claims, 3 Drawing Sheets

(56) References Cited

U.S. PATENT DOCUMENTS

| | | | | |
|---|---|---|---|---|
| 2010/0282836 | A1* | 11/2010 | Kempf | G06Q 50/188 235/375 |
| 2011/0032218 | A1* | 2/2011 | Yang | H03M 1/301 345/184 |
| 2012/0136864 | A1* | 5/2012 | Ochtel | G06Q 30/0633 707/738 |
| 2013/0262241 | A1* | 10/2013 | Nelson | G06Q 30/0276 705/14.72 |
| 2014/0089321 | A1* | 3/2014 | Engel | G06F 16/9535 707/748 |
| 2014/0144977 | A1* | 5/2014 | Argue | G06Q 30/0633 235/375 |
| 2014/0158753 | A1* | 6/2014 | Sisselman | G06F 16/9554 235/375 |
| 2015/0220981 | A1* | 8/2015 | Ikumi | G06Q 30/0268 705/14.51 |
| 2016/0203352 | A1* | 7/2016 | Marsico | G08B 21/02 235/375 |
| 2017/0069177 | A1* | 3/2017 | Takahata | G07G 5/00 |
| 2019/0188775 | A1* | 6/2019 | Rivoli | G06Q 20/203 |

* cited by examiner

SYSTEM AND METHOD FOR RECIPE IDENTIFICATION AND CLASSIFICATION

CLAIM OF PRIORITY

This application claims priority and incorporates by reference United States Provisional Patent Application No. 62/543,602 filed Aug. 10, 2017 with title "Method for Increasing Grocery Sales and Generating and Analyzing Sales Data" and is a Continuation In Part and claims priority to Non-Provisional Patent application Ser. No. 15/911,090, filed Mar. 3, 2018 with the title "Scannable Recipe Card to Associate Purchases with a Recipe" which is also herein incorporated by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

The disclosure herein relates to a process to augment the collection of data from a sales transaction with a particular user for a particular sales transaction with an activity code that inspired the purchase of at least a subset of items purchased at this sales transaction. The activity code could be a suggested menu, a particular recipe, or detailed instructions for a project not related to a meal, such as a sewing or craft project.

Point-of-sale systems are well known in the art. After a user has selected a set of items for purchase, the user proceeds to a check-out station. There with the assistance of a check-out clerk or through a self-checkout station, the set of items are tallied. The process disclosed herein frequently uses some interaction between the point-of-sale system and the items. The interaction may be reading barcodes or sensing RFID tags. As a backup, the system may allow data entry through a user interface.

Thousands of recipes exist online and in print for any one dish to be prepared. As an example, there are thousands of recipes for Chicken Parmigiana. Point of Sale systems are programmed to understand the list of ingredients for a particular recipe when scanned into the system. Identifiers such as QR codes, bar codes, and specialty codes are used to identify and record the purchase of items within a recipe. The Point of Sale system may provide information to the consumer as to where ingredients may be found in the store when the consumer is shopping for ingredients, and is active to store the purchase activity for all ingredients and transmit this information to the central inventory management system for the store in which the ingredients were purchased.

Point-of-sale systems continue to evolve. Scanning systems under development will allow the consumer to simply push a cart filled with products past a scanning station to tally the list of items in the cart without the use of the traditional check-out station. Other systems may use computer vision and other tools to track what items were placed in the consumer's shopping cart. It is anticipated that there will continue to be evolution within the field of point-of-sale systems and the teachings of the present disclosure may be extended to any system capable of combining a tally of items purchased with a code for a particular activity that inspired at least a portion of the set of purchased items.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
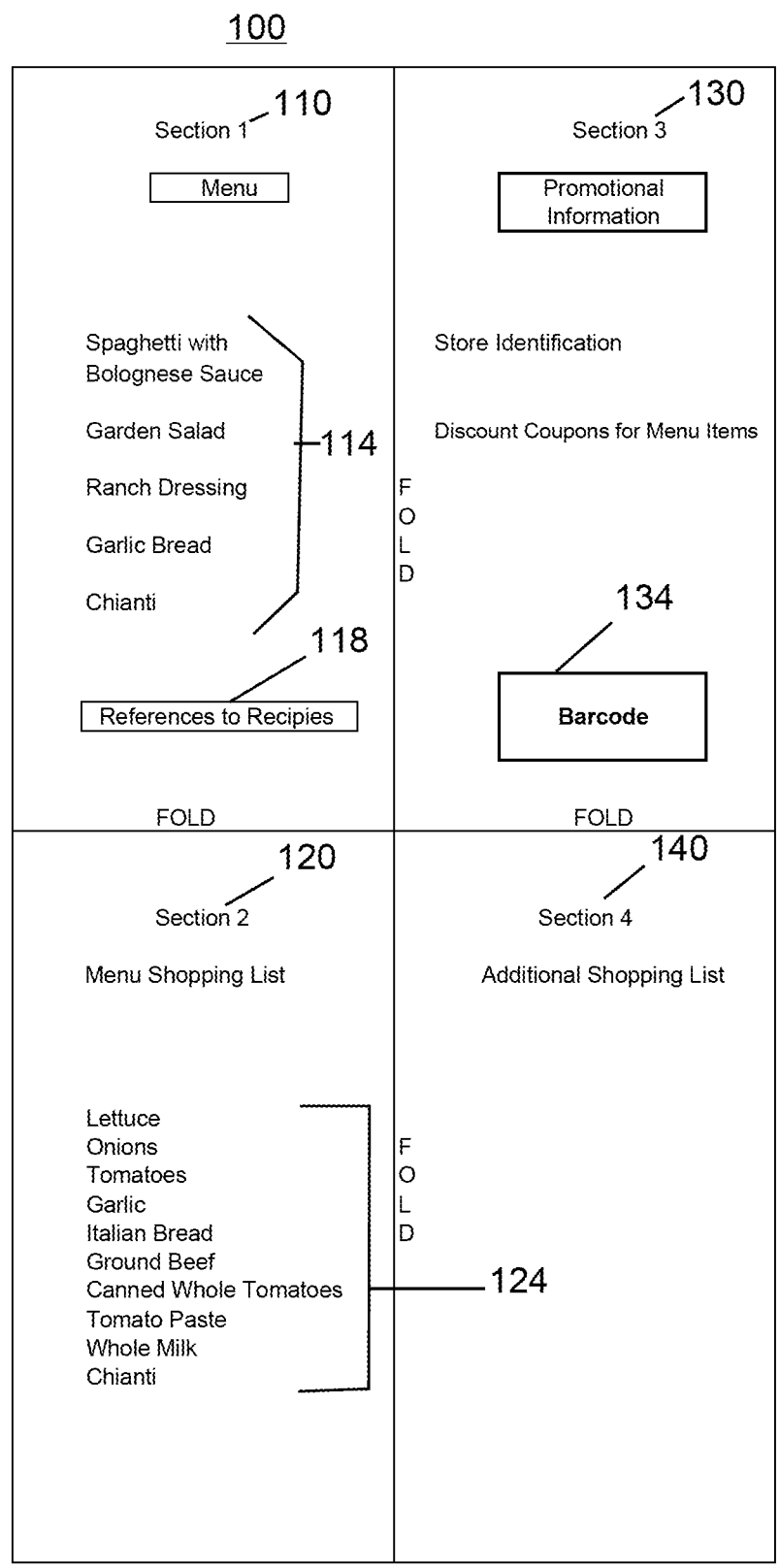
FIG. 1 is a front plan view of a menu-shopping list having a barcode or other identifier consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

As used in this document, the terms "scan", "scanned", and/or "scanning" refer to the action of scanning, utilizing a scanning device, a universal identifier as presented by a customer at a retail establishment at any point in the interaction of the customer with individuals or systems within the retail establishment.

One aspect of the teachings of the present disclosure is based on the utility of knowledge of what specific recipes grocery customers prepare and what ingredients they buy to prepare a recipe. Conventional grocery sales data analysis relies on identifying what products customers buy, which is obtained by tracking customer purchases at the point of sale. Grocers also identify specific customers' purchases by scanning customer loyalty cards, and then target the identified customers for email or mail promotions, based on analysis of their purchases. However, current data analysis does not provide information on what customers prepare with the products purchased. This invention identifies what recipes customers are shopping to prepare, in addition to the conventional method of identifying the products they buy. It may be entirely anonymous or associated with identified customers.

Cooking to a menu or recipe is a widespread pursuit in American culture, to the extent that at least two television networks are dedicated entirely to cooking. There are also several cooking magazines with subscription circulations of over 1,000,000 subscribers. Grocers sell ingredients to prepare specific recipes, but they don't have a means to track what recipes their customers prepare.

This invention capitalizes on the cooking market by providing a means to link and classify recipes consumers prepare to the products they buy to prepare them. The matched recipe and products purchased data may also be linked to specific customers, or the new data may be entirely anonymous. The invention combines a pre-defined activity such as preparing a recipe, a pre-defined shopping list required to prepare the recipe and a unique identifier to link the grocery purchase transaction to the pre-defined shopping list. The link may be accomplished by inputting the unique identifier printed on the template at the point of sale. With nearly 40,000 grocery stores in the United States, and hundreds of transactions per store per day, an opportunity exists for very large amounts of market information to be created by the invention and captured by grocers, who may then analyze it and base marketing decisions on their analysis. Grocers rely heavily on sales data analysis to gain insight into their customer's product purchasing profile, and the instant innovation adds direct insight into what recipes consumers are preparing, in addition to the products purchased to implement recipes.

Current systems describe the data capture for recipe ingredients in terms of unique identifiers, such that every one of thousands of chicken parmigiana recipes would have a unique identifier, not be aggregated under a universal classification identifier. The instant system would, instead, aggregate thousands of recipes for the same dish by the classification of thousands of recipes for the same dish into one universal identification code, based upon the pre-set classification for the recipe as contained in the identifier attached to the recipe. In this manner, if thousands of the unique classified identifier for thousands of different recipes for the same dish are scanned, a grocer obtains the identity of that one dish as expressed by the recipe, instead of thousands of different identities for the same dish.

Prior to the creation of this innovation system, a single grocer may have created a recipe for a dish, assigned a unique identifier code and made that recipe and identifier available for shopping and scanning. However, this is not how most consumers locate and use recipes. Most consumers access their preferred website or cookbook, of which there are thousands in existence, and locate the dish and a recipe for that dish on their favorite website or cookbook. The vast majority of customers would not use a grocer's recipe, and instead use recipes taken from their favorite sources. It would be very useful for grocers to know which of those recipes customers regularly use, to better understand their customers and inform marketing decisions. Absent a classification system, every one of those thousands of recipes would require a unique identifier incorporating the recipe and source for that specific recipe.

Given there are thousands of recipe sources, and a relatively smaller number of popular recipes, thousands of recipes for the same popular recipes exist. If one searches for a recipe for lasagna, pot roast or some similar popular recipe, for example, a search engine would return thousands or even millions of recipes for the same dish. So, if every recipe were uniquely identified, then a grocer could easily be faced with 3,000 unique identity codes for 3,000 unique lasagna recipes. That amount of data compounded over 40,000 stores and 30-40 popular recipes, very big data indeed, would be extremely impractical to analyze, and would require a tremendous amount of work after the data were collected.

The instant innovation implements the classification of thousands of data points into one far more refined data point prior to the identifier being scanned into a retail location point of sale system. The instant innovation refines a very large volume and variety of data that would be impractical to analyze into a far more refined body of data that is highly practical to analyze, achieving economies of scale in the analysis of the aggregated data and optimizing the reporting of recipe classification data to the retail location. In a non-limiting example, every one of 3,000 unique lasagna recipes could classified into one lasagna recipe identifier, and scanned thousands of spaghetti recipes, thousands of pot roast recipes, and so on. The identifier could contain multiple attributes of classification that could be analyzed after collected. For example, lasagna could be classified as Italian cuisine, ground beef main ingredient, tomato sauce and lasagna specific recipe. An identifier for chicken Marsala would have similar attributes—Italian cuisine, chicken main ingredient, Marsala sauce, etc., some of which attributes are in common with lasagna, some of which are not. So various individual attributes or combinations of attributes collected over millions of transactions could be analyzed.

In an embodiment, a linked list incorporated within a bar code, QR code or other scannable code may be configured internally by a given retailer or the linked list and scannable code could be configured by an external, independent author. The linked list embedded within a scannable code may form a universal identifier that may be scannable or recognizable by standard Point-of-Sale systems or other systems. A schedule of the universal identifiers could be distributed periodically to users, such as retail establishments, or accessed online.

The universal identifier may be maintained and updated by a central authority and distributed so as to be capable of use by any retailer. One configuration could be a hierarchy classification of a recipe such as:

1.0=main ingredient (e.g. example chicken)
    1.1=main ingredient+cuisine (e.g. chicken+Italian)
    1.1.1=main ingredient+cuisine+general recipe (e.g. chicken+Italian+Chicken Parmigiana)
    1.1.1.1=main ingredient+cuisine+recipe+specific recipe author (e.g. chicken+Italian+Chicken Parmigiana+Martha Stewart)

The hierarchy of classification may vary in depth as determined by a user of the linked list. Note that the linked list may also provide utility for an individual recipe author, such that the author may also track the use of their recipe as they would a product for sale. Note also that alternative embodiments may be utilized in other retail sectors for other pre-defined shopping lists, for instance in the home improvement sector for a pre-defined home improvement project, or in the home goods sector for a pre-college moving list. The linked list may function in print or in internet applications.

Note that those of skill in the art will recognize that rather than having fields and subfields within a unique identifier to denote that this is a chicken recipe or the source was Martha Stewart that the unique identifier could be used without having fields and subfields and the unique identifier would be associated with an array of relevant information such as chicken recipe, Italian cuisine, Chicken Parmigiana, and source was Martha Stewart. This array would be stored in a data storage form accessible by a computer such as a table, database, or other information storage format. Additionally, a customer could categorize a recipe and generate a universal identifier for a recipe that the author has not previously categorized.

In an embodiment, the classification of recipes in its broadest scope would have a hierarchy of classification attributes, such as cuisine, main ingredient, specific dish, and source. In a non-limiting example, in a recipe for chicken parmigiana, the classification hierarchy could be Italian cuisine, chicken main ingredient, chicken parmigiana specific recipe, and magazine as the source. There may be additional attributes such as nutritional information, specific author, or other attributes for further identification of the provenance of the recipe being classified.

In an embodiment, consumers may obtain a favorite recipe for a given dish, for example a recipe for chicken parmigiana. The universal identifier for the chosen dish may be associated with the recipe so as to be included with the recipe. The consumer may download the recipe as a printed recipe card, as a screen shot from a webpage, as a mobile device image, or any other scannable representation of the recipe that a consumer may present to the scanner associated with a retail Point-of-Sale system. The consumer would take the downloaded recipe representation with them to a retail establishment, such as a grocery store or convenience store, where they may shop for the ingredients contained within the recipe. The consumer may present the recipe to the Point-of-Sale system for scanning, where the consumer may receive an incentive such as a coupon or other incentive for scanning the recipe. Upon scanning, the consumer would receive the incentive and the retail establishment would have information from the universal identifier on what recipe the consumer is preparing. The universal identifier information would then be analyzed and placed within the proper aggregated dataset in which the scanned recipe is a member. In this fashion, the retail establishment would receive a more accurate count of the number of particular recipes are being presented for each category of dishes being prepared.

In an embodiment, the process for aggregating and analyzing the recipes being prepared by consumers based upon the presentation of recipes containing the universal identifier may begin with segmenting recipes based upon the broadest category of food to which a recipe could belong in an established hierarchy for each dish. The categorization may be further refined by adding subsets of the broadest category until a particular dish as described in a recipe is established. In a non-limiting example, as previously described, one particular categorization scheme may be chicken recipe, Italian cuisine, Chicken Parmigiana to categorize a chicken parmigiana recipe. Additional subsets may be established to associate further relevant information about the recipe.

Once the hierarchy of dishes has been established, the system may create a scannable representation of the universal identifier. This scannable representation of the universal identifier may take the form of a bar code, QR code, or other code that may be included in a recipe such that when the consumer downloads the recipe, in any format such as print, web page, coupon, shopping list, or mobile device screen, the scannable universal identifier is included as a portion of the recipe. The categories within the universal identifier may be managed by a central authority that incorporates updates, additions, deletions, or modifications to the hierarchy, where the central authority may periodically distribute an updated list of the hierarchy and recipe categories to all retail establishments using the system.

When the consumer has completed shopping, the recipe containing the scannable representation of the universal identifier is presented at checkout and scanned by the retail Point-of-Sale system. The scanned data, including the universal identifier is transferred to the retail establishment electronic file system for storage and later analysis. The data may then be analyzed and all recipe information categorized and aggregated based upon category by an analytics process on behalf of the retail establishment. The recipe and data about the consumer is aggregated and stored in an electronic storage file system based upon recipe category. This category data, along with any additional analysis, is provided to management personnel of the retail establishment to permit the retail establishment to optimize advertising and sales programs.

Analysis of data collected from the scanned identifiers provides statistics that may drive marketing, advertising and merchandising strategy. For instance, if a grocer finds that certain stores have a large percentage of Italian recipes scanned, larger Italian ingredient displays may be implemented. If analysis indicates that a specific customer cooks specific recipes, incentives for matching ingredients may be offered by email.

Analytical results may be provided to a user to inform and activate programmatic direct marketing, programmatic direct advertising, and programmatic direct mail.

Programmatic marketing provides for marketing actions that may take place automatically, without human intervention, driven by an automated system owned, managed and maintained by a retail establishment.

In a non-limiting example, where a retail establishment such as a grocer can connect a transaction with a specific customer and an email address or physical address, then when that customer presents a given recipe universal identifier and the universal identifier is scanned, an email or direct mail with programmed content would be automatically triggered to that specific customer. For example, when an Italian recipe identifier is scanned it could trigger a programmatic incentive or promotion to the customer for Chianti or some other Italian product.

In a non-limiting example, coupons, promotions, and advertising may be personalized and sent to a specific customer based on the recipe identifiers scanned when the specific customer interacts with a scanner or employee utilizing a scanner in a retail establishment. In this non-limiting example, a customer may present a universal identifier at any point during the shopping experience within the retail establishment, have the universal identifier scanned, and quickly receive promotions, incentives, coupons, and/or rewards that are personalized to the individual customer.

In a non-limiting example, the universal identifier could be scanned by a customer to enter into an online shopping process, for instance with an online retailer such as Amazon, and the online retailer could quickly return promotions, advertising, coupons, awards, and/or incentives to the customer. Additionally, a universal identifier could be scanned upon entry to a store, and generate "real-time" coupons before or during shopping, instead of after checking out.

In an embodiment, automatic responses to a scanned universal identifier could be transmitted by text to a mobile device associated with a customer.

In an embodiment, automatic responses to a scanned universal identifier could also be sent to advertisers, as well as to customers, to solicit the purchase of advertising. Advertising could directed to a specific customer, or placed on a grocer's website, either generated in response to the scanning of a universal identifier linked to a particular recipe. For instance, scanning Italian recipe universal identifiers could generate a solicitation to every pasta manufacturer, who could then advertise on a grocer's website or send an ad directly to a customer.

The system implements the classification of thousands of data points into far more refined data points prior to the universal identifier being scanned into grocers' data systems. It refines a very large volume and variety of data that would be impractical to analyze into a far more refined body of data that is highly practical to analyze.

Turning now to FIG. 1, this figure presents a front plan view of a menu-shopping list having a barcode or other identifier consistent with certain embodiments of the present invention. In an exemplary embodiment, a shopping list 100 that a grocer would provide in accordance with the invention. There may be four sections. The menu section 110 would be one of many options for different menus 114 or recipes. The menu section 110 may include an identifying link 118 such as a URL or a barcode that allows the user to pull up a specific recipe for use in the menu 114. Alternatively, the main item in this section may be a specific part of a menu such as the main course or the dessert. For example, the card 100 may be focused on the ingredients for boeuf bourguignon as the user does not need the card to address the other items to be served such as a fresh salad and bread from a specialty bread store down the street.

The shopping list section 120 would have the shopping list 124. The shopping list 124 provides the specific items required to prepare the menu or recipe. An additional items section 140 provides the shopper with a convenient place to add other needed items. Finally, a section 130 includes the barcode 134 that identifies the specific menu-shopping list. This barcode 134 may be scanned to link an individual transaction as the check-out of the store to a specific menu-shopping list.

Figure 2:
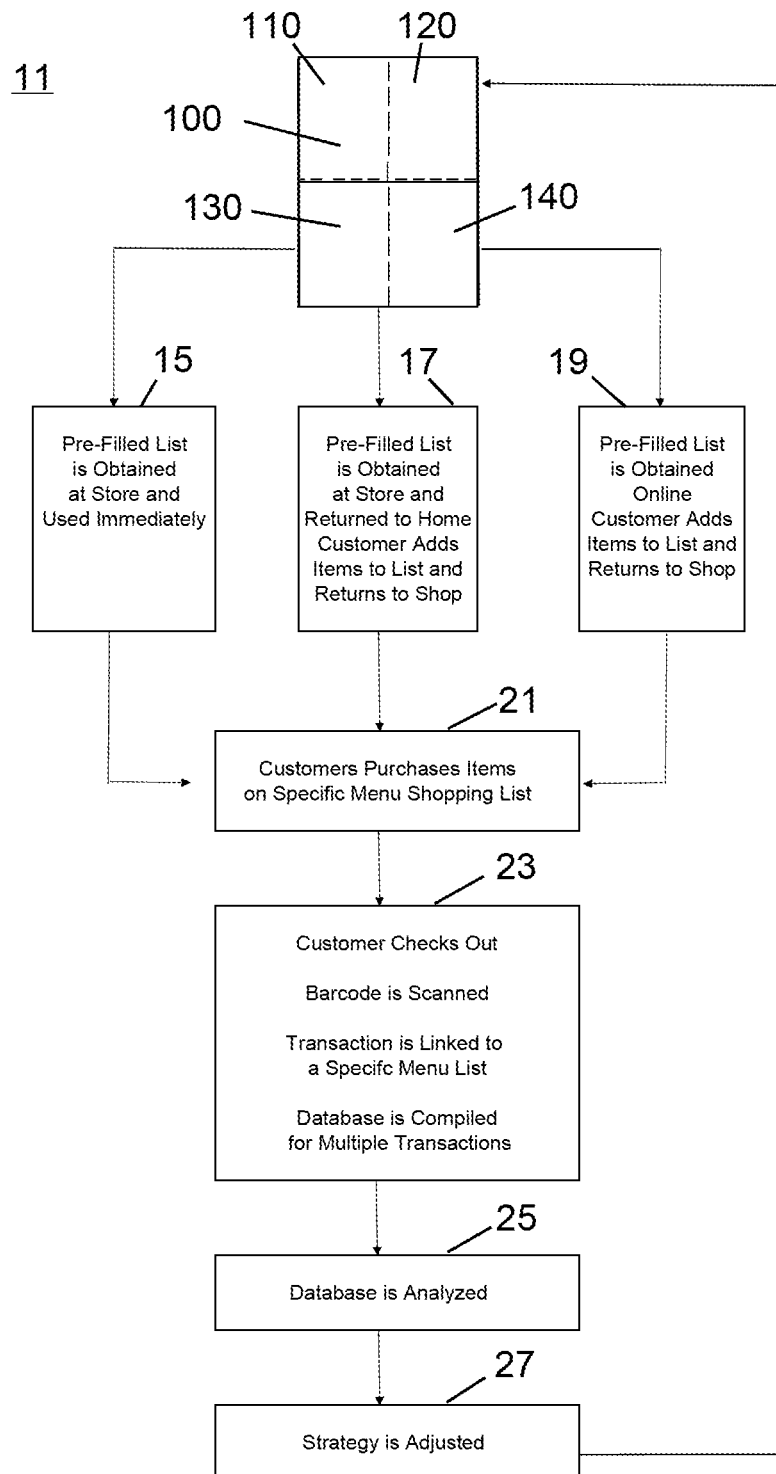
FIG. 2 is a flow diagram for the menu-shopping list as used for increasing grocery sales and creating and analyzing sales data consistent with certain embodiments of the present invention.

Turning now to FIG. 2, this figure presents a flow diagram for the menu-shopping list as used for increasing grocery sales and creating and analyzing sales data consistent with certain embodiments of the present invention. In an exemplary embodiment, the system presents a first branch 15 of the prefilled list that is obtained at a store where the customer uses it immediately to purchase items on the list. For example, the seafood department may have a suggested recipe for a particular seafood product—Orange Roughy, and suggested side items and wine to accompany the dinner. The user would merely need to scale the purchase from the suggested amounts for four people up or down to adjust for the number of diners and possibly for their proclivity to seek second helpings.

Alternatively, in the second branch path, the action 17 is that the customer obtains the shopping list 100 at the store and takes the shopping list 100 home to add items, and then returns to shop with an expanded list.

Alternatively, in the third branch path, the action 19 that the shopping list 100 is obtained online or from some other source such as a magazine, a subscription program that mails recipe lists, or another non-store source and the customer uses the shopping list 100 either as is or with modifications. Note, the online version may be accessed on a smart phone app and the entire process may be done on the app, including scanning the barcode at checkout (see below).

At the store, the action 21 is that the customer purchases at least some of the items on the list, possibly all of the items on the list, or some other combination such as some of the items plus other items. Tracking the use of the list and what the customer buys is potentially useful to allow the grocery store owner to determine which menu-shopping lists result in the greatest number of total sales, establish promotions, etc.

At action block 23, the customer then checks out. The point of sale system collects a list of what items are purchased during this trip to the store and collects that barcode that is a unique identifier for this specific menu or recipe card. Thus, the information of which items sold is associated with specific menus is collected through scanning and stored on the store's network to create a database.

In action block 25, the database which includes the sales transactions connected to the particular barcode values 134 are analyzed.

In action block 27, the analysis from action block 25 leads to strategy adjustments. Some of the strategy adjustments may impact the creation of the lists 100 with respect to store provided lists 100 or by advertising with non-store sources for lists 100 so that the store ad is visible when a user is obtaining a list.

The range of strategy adjustments is extensive. Non-limiting examples include:
- Menus for vegan meals may be made available for one person if the process notes that the typical vegan menu has a number of purchases that are scaled down from the base level of two adult diners.
- Menus for certain items may be rescaled for additional diners if it becomes apparent that these items are usually made for special events where there are six, eight, or more diners.
- Wine suggestions may be moved to wines of a particular price point based on the wines frequently purchased with a particular menu. For example the price point of the wine suggested to go with a menu using lobster tails may be adjusted upward while the price point of wine suggestions to accompany tilapia may be adjusted downward.

A national chain that has a recipe for apple pie may find that the stores in certain regions should suggest vanilla ice cream to accompany the pie while other stores in another region may suggest slices of cheddar cheese.

The barcode 134 or other identifier may be configured in a hierarchy of classification that provides a basis of aggregation and analysis by the grocer. Or the barcode could allow the grocer to obtain the classification information from a data base. The computer network used by the store may be conventional and includes standard computers, databases and the like. Software such as statistical analysis software can be used to analyze trends tied to menus use and increased sales.

The method of using the menu of the invention provides that at checkout at a grocery store, all items purchased by a purchaser in a database are scanned and recorded on a point-of-sale database system. The barcode 134 on a card 100 for specific menu-shopping list is scanned before, during, or after the actions to record the items purchased. In the computer database system the items purchased with the specific menu-shopping list for which the barcode 134 was scanned are associated with the menu-shopping list. The information associating the items purchased with a specific menu is then stored in a database comprised of data linking purchases with specific menus. By later analyzing the collected data adjustments can be made in the menu-shopping lists to increase sales.

Figure 3:
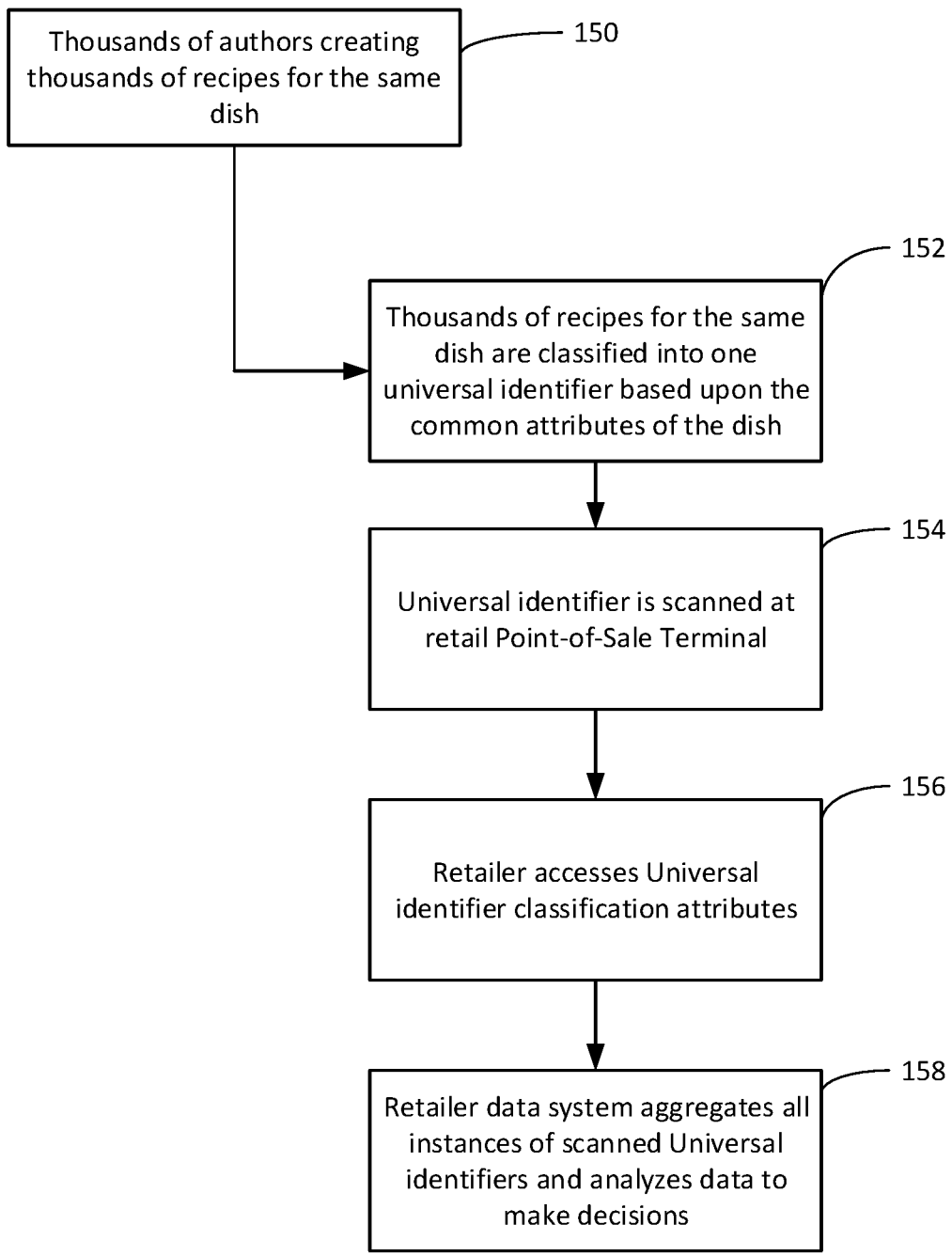
FIG. 3 is a flow diagram for aggregating and classification of recipes consistent with certain embodiments of the present invention.

Turning now to FIG. 3, this figure presents a flow diagram for aggregating and classification of recipes consistent with certain embodiments of the present invention. In an exemplary embodiment, the classification of recipes in its broadest scope would have a hierarchy of classification attributes, such as cuisine, main ingredient, specific dish, and source 150. In a non-limiting example, in a recipe for chicken parmigiana, the classification hierarchy could be Italian cuisine, chicken main ingredient, chicken parmigiana specific recipe, and magazine as the source. There may be additional attributes such as nutritional information, specific author, or other attributes for further identification of the provenance of the recipe being classified.

At 152, once a recipe has been classified, authors or consumers could obtain the same unique, universal classification identifier for every one of the thousands of recipes for the same dish. In this fashion, every one of thousands of chicken parmigiana recipes may have the same unique, universal classification identifier. In this manner, the data for each of the hundreds or thousands of recipes for a particular dish could be aggregated under the single recipe classification. This data could then be scanned at a Point-of-Sale terminal 154 and reported by a Point-of-Sale terminal or other system to the retail establishment to inform decisions regarding marketing, advertising, production strategies, and other outreach to consumers.

At 156, a user, such as, in a non-limiting example, a retail establishment information management system administrator, may access the aggregated recipe classification data from the electronic storage media in which the aggregated recipe classification data has been stored. The retailer information management system may be operative to aggregate all instance of the scanned universal identifiers and scan the aggregated recipe information to determine how many instances of each recipe occur in the accumulated data. The recipe instances may also include ancillary data on the consumer presenting the recipe, as well as additional information such as nutritional information, source of each recipe, specific author of each recipe, and specific source for each recipe, among other data that may be associated with the recipe. The data may be analyzed by the retailer information management system to determine what recipes occur most frequently, from what sources recipes are most frequently culled, and additional analyses of the accumulated data that will assist in making marketing and advertising decisions both more targeted and more granular. More targeted advertising decisions permit the retailer to reach consumers that are more likely to purchase goods from them, and more granular decisions permit the retailer to focus on market segments that are of more interest in terms of geographic location, deeper interest in particular products, more active in the purchase of goods sold by a retailer, or any other segmentation of the data upon which a retailer would like to focus 158.

While certain illustrative embodiments have been described, it is evident that many alternatives, modifications, permutations and variations will become apparent to those skilled in the art in light of the foregoing description.

What is claimed is:

1. A method for identifying a dish that a customer is shopping for, comprising:

receiving an electronic request from a user to provide a universal identifier for a dish described by an online recipe, wherein the dish is expressed by a plurality of recipes from unrelated authors, each recipe including a list of ingredients to use to prepare the dish, and wherein the universal identifier is not unique to the author of the online recipe and the list of ingredients of the online recipe;

assigning a universal identifier to the dish based on information contained in the online recipe;

generating an electronically scannable barcode or QR code associated with the universal identifier for the dish, the electronically scannable barcode or QR code being electronically coded to represent the universal identifier such that the representation of the universal identifier does not uniquely identify the online recipe; and transmitting the electronically scannable barcode or QR code over a network to the user in a format such that the electronically scannable barcode or QR code can be transported to a retail location of a retailer where the electronically scannable barcode or QR code can be electronically scanned and decoded by a point-of-sale system at the retail location to provide an identification of the dish to the retailer.

2. The method of claim 1, wherein the electronically scannable barcode or QR code is transmitted over the network to the user by sending it to a mobile application associated with the user to be displayed by the mobile application on a mobile device.

3. The method of claim 1, wherein the electronically scannable barcode or QR code is transmitted over the network to the user by sending an embeddable software component that can be embedded into a webpage displaying the online recipe.

4. The method of claim 1, wherein the electronically scannable barcode or QR code is transmitted over the network to an author of the online recipe for publication with the online recipe.

5. The method of claim 1, wherein the electronically scannable barcode or QR code is transmitted over the network by generating a standalone webpage that displays the electronically scannable barcode or QR code in response to the user clicking a hyperlink displayed with the online recipe.

6. The method of claim 1, further comprising identifying the dish based on the universal identifier associated with the dish by accessing a schedule of universal identifiers.

7. The method of claim 1, further comprising identifying the dish based on the universal identifier associated with the dish, and associating the identified dish with a loyalty account associated with the user presenting the electronically scannable barcode or QR code for scanning and decoding at the retail location.

8. The method of claim 7, further comprising transmitting an incentive to the user based on the identified dish.

9. The method of claim 8, wherein the incentive is a coupon for a generalized ingredient or other item associated with the identified dish.

10. The method of claim 1, further comprising distributing a schedule of universal identifiers periodically to retail establishments, publishers, individual authors of recipes, or other recipe creators.

11. The method of claim 1, wherein assigning the universal identifier to the dish includes generating the universal identifier if the universal identifier for the dish does not already exist.

12. The method of claim 1, wherein information relating to the identified dish is stored at a back-end server as a hierarchical classification structure associated with the universal identifier, wherein the hierarchical classification structure includes food categories in a structure having a main category set with multiple subset tiers comprising at least a main ingredient, a cuisine, a recipe, and a recipe author.

13. The method of claim 1, further comprising analyzing data associated with the universal identifier to determine what dishes are selected most frequently.

14. The method of claim 1, further comprising providing data analysis from all data captured from scanned universal identifiers to the retailer to assist the retailer in formulating advertising and marketing decisions.

15. The method of claim 1, wherein the universal identifier is associated with a classification system that includes a plurality of attributes of classification of the dish, the attributes including at least a main ingredient of the dish, a type of cuisine of the dish, and a name of the dish.

16. The method of claim 1, further comprising providing access to an online catalog of the schedule of universal identifiers to the retailer.

\* \* \* \* \*